April 29, 1924.
J. E. LEONARZ
1,492,038
FURNACE ELECTRODE
Original Filed Sept. 22, 1921
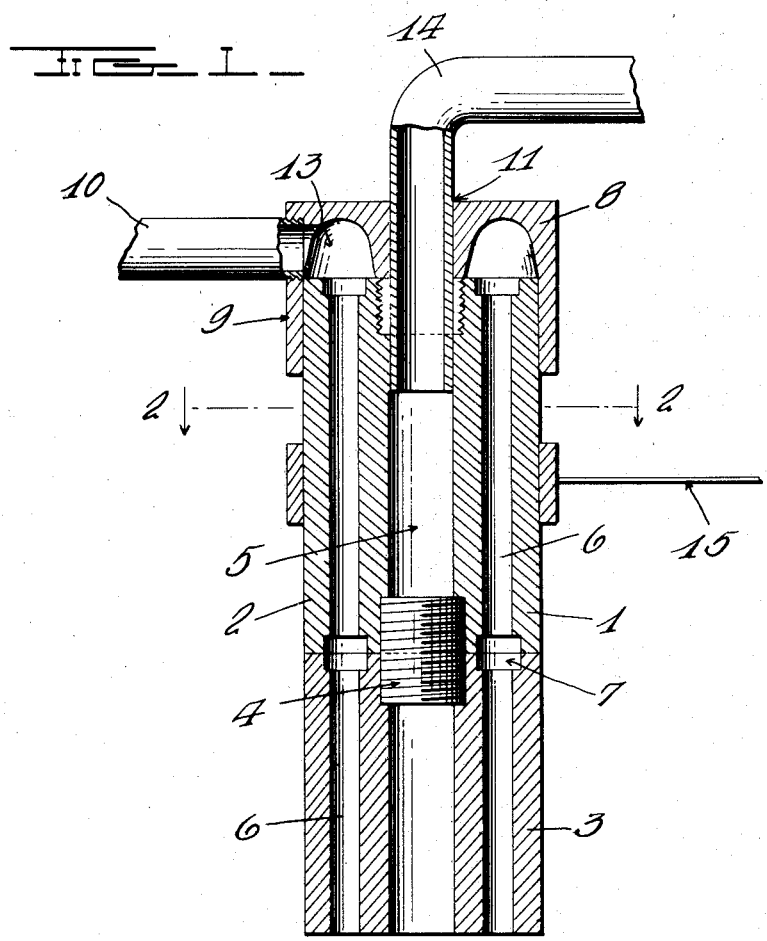
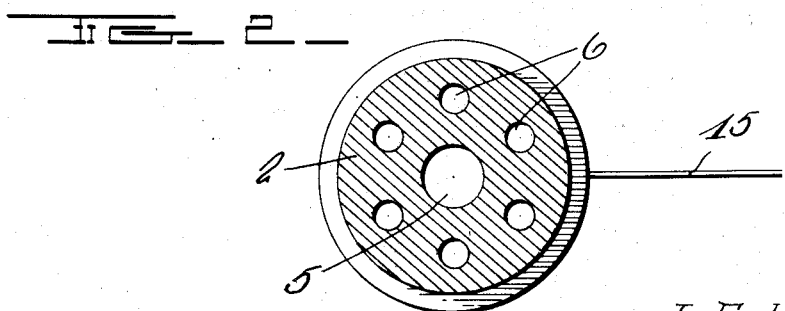
Inventor
J. E. Leonarz
By Gordon Stewart
Attorneys Patented Apr. 29, 1924.

1,492,038

UNITED STATES PATENT OFFICE.

JOHANN EMIL LEONARZ, OF TACUBAYA, MEXICO.

FURNACE ELECTRODE.

Application filed September 22, 1921, Serial No. 502,513. Renewed March 15, 1924.

*To all whom it may concern:*

Be it known that I, JOHANN EMIL LEONARZ, a citizen of Germany, residing in Tacubaya, D. F., Mexico, have invented certain new and useful Improvements in Furnace Electrodes, for which the following is a full and complete specification, reference being had to the accompanying drawings.

Electric furnaces for metallurgical purposes, and in particular for the reduction of ores, require electrodes of considerable dimensions. The passage of electric energy through electrodes of this type heats up the electrodes and therefore limits their carrying capacity. It is the general practice to prevent the entrance into the electric furnace of gases which might serve to draw off the heat generated therein. It is found that by the use of an electrode possessing internal cooling means, more electrical energy may be transmitted through the same cross section than is otherwise the case.

It is the purpose of this invention to produce an improved furnace electrode having means such as longitudinal channels through which cooling fluid is passed and the electrodes therefore maintained at their highest efficiency.

Certain metallurgical operations involving the addition of carbonaceous or other material may be carried out advantageously in an electric furnace. It is a further object of my invention to use the electrode for the introduction of such material. In this manner the added material is delivered directly within the zone of greatest heating at the arc.

Other advantages of my invention will be apparent from the following description and drawing in which latter, Fig. 1 is a longitudinal section of an electrode, and Fig. 2 is a transverse cross section on the line 2—2 of Fig. 1.

For purposes of illustration, the improved electrode is shown to consist of a cylinder 1 of conducting material preferably some form of carbon. This electrode is shown to consist of two sections, 2 and 3, capable of being fastened end to end by means of a screw threaded sleeve 4 or equivalent device. This sleeve 4 is of the same material as the remainder of the electrode and operates in the same manner.

The electrode has an axial channel 5 running from end to end and passing through each section 2 and 3 and the sleeve 4. Suitably spaced around the center is a series of longitudinal channels 6. These channels may vary in number, location and form, it being merely essential that they serve to suitably cool the surrounding material by means of the passage of cooling fluid. At the end of each section 2 the channels 6 are enlarged as shown at 7 to insure a continuous passage from the channel 6 of one section 2 through the corresponding channel in the adjacent section 3.

A cap 8 rests upon the upper end of section 2. This cap has a depending flange 9 and a gas inlet port 10. The cap has an axial opening 11 in line with the central channel 5 of the electrode. An inner wall 12 on the cap 8 surrounds the axial opening 11. An annular passageway 13 surrounds the wall 12 and connects with the inlet port 10. A duct 14 extends through the opening 11 and into the opening 5.

Suitable means shown diagrammatically at 15 serves to connect the electrode with the source of electrical energy in the customary manner. The sections 2 and 3 of the electrode are assembled end to end and the upper section carries the conductor 15 and the cap 8 with its associated parts. Through the inlet port 10, cooling gases are introduced under pressure and pass through the channels 6. These cooling gases are preferably those resulting from the reduction of ore as shown in my copending application for patent on electric furnaces, S. N. 501,384, filed September 17, 1921. During the downward passage of the gases through the channel 6 the gases serve to maintain the electrode in a relatively cool condition. As the gases approach the lower end of the electrode they become highly heated and therefore have no disturbing effect upon the arc through which they pass.

Through the tube 14 carbonaceous or other material such as comminuted ore is fed into the passage 5. The material is then highly heated by its passage along the electrode and prepared for reduction in the arc. At the same time this material and its conveying fluid serve to cool the electrode materially.

It is, of course, obvious that numerous changes may be made and that the various materials may be added through separate channels while cooling gases alone may be passed through the central channel 14. Other minor changes in details and arrangement may be made without departing from the spirit of my invention as defined in the following claims.

What I claim is:

1. An electrode including a cap having an inner tubular wall, an outer flange concentric with said wall and forming therewith an annular passage, a port leading to the annular passage, and a conductor adapted to fit in said flange.

2. An electrode including a cap having an inner tubular wall, an outer flange concentric with said wall and forming therewith an annular passage, a port leading to the annular passage, and a conductor adapted to fit in said flange, said conductor having channels in registry with the tubular wall and the annular passage.

3. An electrode including a series of conductors arranged end to end, said conductors each having a plurality of longitudinal passageways, the passageways of one conductor registering with those of the adjacent conductor, and means for introducing a cooling medium to the passageways of one conductor.

4. In an electrode, a conductor section having a central longitudinal channel and a plurality of longitudinal channels arranged equidistantly around the central channel.

In testimony whereof, I have hereunto affixed my signature.

JOHANN E. LEONARZ.